US011987044B2

(12) United States Patent
Clement et al.

(10) Patent No.: US 11,987,044 B2
(45) Date of Patent: *May 21, 2024

(54) METHOD FOR MANUFACTURING PANELS HAVING A DECORATIVE SURFACE

(71) Applicant: Unilin, BV, Wielsbeke (BE)

(72) Inventors: Benjamin Clement, Waregem (BE); Luc De Boe, Moorslede (BE)

(73) Assignee: Unilin, BV, Wielsbeke (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,586

(22) Filed: May 10, 2022

(65) Prior Publication Data

US 2022/0266610 A1 Aug. 25, 2022

Related U.S. Application Data

(60) Continuation of application No. 17/035,906, filed on Sep. 29, 2020, now Pat. No. 11,446,938, which is a (Continued)

(30) Foreign Application Priority Data

Aug. 6, 2012 (EP) .................................... 12179400

(51) Int. Cl.

*B44C 5/04* (2006.01)
*B41J 2/01* (2006.01)

(Continued)

(52) U.S. Cl.

CPC ......... *B41J 11/00214* (2021.01); *B41J 3/407* (2013.01); *B41J 11/0015* (2013.01);

(Continued)

(58) Field of Classification Search

CPC .. B41J 11/00214; B41J 3/407; B41J 11/0015; B41J 2/01; B41M 5/5218; B44C 3/048; B44C 5/04; B44C 5/0446; B44C 5/0469

See application file for complete search history.

(56) References Cited

U.S. PATENT DOCUMENTS 3,769,143 A 10/1973 Kulesza
3,983,307 A 9/1976 Power et al.

(Continued)

FOREIGN PATENT DOCUMENTS

CA 1064778 10/1979
CN 1973089 A 5/2005

(Continued)

OTHER PUBLICATIONS

Monica Badila et al., "Evaluation of the compatibility between low pressure melamine (LPM) film printing substrates and inkjet inks," Eur. J. Wood Prod., 2012, p. 639-649, published online.

(Continued)

*Primary Examiner* — Yaovi M Ameh
(74) *Attorney, Agent, or Firm* — Capitol City TechLaw

(57) ABSTRACT

Panels having a decorative surface may include a plate shaped substrate and a top layer, and the top layer may include a paper layer having a printed pattern. A method for manufacturing such panels may involve providing the paper layer with a treatment, including providing the paper layer with an ink receiving substance. The treated paper layer may be provided with at least a portion of the printed pattern by depositing pigment containing inks using a digital inkjet printer. The pigment containing inks may be water-based. The digital inkjet printer may include print heads with nozzles for firing droplets of pigment containing inks onto the treated paper layer. The paper layer may be fed from a roll, printed upon, and rolled back up again. The paper layer, while printing, may be flexible and may be attached to the plate shaped substrate after printing. A layer of thermosetting resin may be applied above the paper layer and the printed pattern. Providing the layer of thermosetting resin may involve a press treatment. The paper layer may be a (Continued)

colored base paper, a pigmented base paper, and/or a dyed base paper.

15 Claims, 2 Drawing Sheets

Related U.S. Application Data continuation of application No. 16/925,885, filed on Jul. 10, 2020, now Pat. No. 10,814,648, which is a continuation of application No. 16/720,301, filed on Dec. 19, 2019, now Pat. No. 10,807,385, which is a continuation of application No. 16/247,969, filed on Jan. 15, 2019, now Pat. No. 10,549,550, which is a division of application No. 15/390,641, filed on Dec. 26, 2016, now Pat. No. 10,214,028, which is a continuation of application No. 15/075,515, filed on Mar. 21, 2016, now Pat. No. 9,566,823, which is a continuation of application No. 14/417,766, filed as application No. PCT/IB2013/056310 on Aug. 1, 2013, now Pat. No. 9,321,278.

(60) Provisional application No. 61/751,364, filed on Jan. 11, 2013.

(51) Int. Cl.

| | |
|---|---|
| ***B41J 3/407*** | (2006.01) |
| ***B41J 11/00*** | (2006.01) |
| ***B41M 5/52*** | (2006.01) |
| ***B44C 3/04*** | (2006.01) |

(52) U.S. Cl.

CPC ........... *B41M 5/5218* (2013.01); *B44C 3/048* (2013.01); *B44C 5/04* (2013.01); *B44C 5/0446* (2013.01); *B44C 5/0469* (2013.01); *B41J 2/01* (2013.01)

(56) References Cited

U.S. PATENT DOCUMENTS 4,006,048 A 2/1977 Cannady, Jr. et al.
4,076,566 A * 2/1978 Power .................... B32B 21/06 156/220
4,895,759 A 1/1990 Crawford
5,227,359 A 7/1993 Mikoshiba et al.
5,296,447 A 3/1994 Suto et al.
5,407,895 A 4/1995 Egashira et al.
5,478,631 A 12/1995 Kawano et al.
5,494,885 A 2/1996 Kudo et al.
5,612,280 A * 3/1997 Takahashi ............ B41M 5/3333 503/216
5,639,539 A 6/1997 DeProspero et al.
5,712,222 A 1/1998 Shirai et al.
5,939,231 A 8/1999 Kawamura et al.
5,989,378 A 11/1999 Liu et al.
6,132,878 A 10/2000 Kojima et al.
6,174,095 B1 1/2001 Desie et al.
6,291,127 B1 9/2001 Dagan et al.
6,300,279 B1 10/2001 Macedo
6,455,206 B1 9/2002 Hasegawa et al.
6,517,674 B1 2/2003 Das
6,551,694 B1 4/2003 Imamichi et al.
6,599,592 B1 7/2003 Schulz
6,605,337 B1 8/2003 Mori et al.
6,632,488 B2 10/2003 Okumura et al.
6,652,931 B1 11/2003 Otani et al.
6,677,006 B2 1/2004 Otani et al.
6,677,008 B2 1/2004 Chen et al.
6,706,372 B2 3/2004 Schulz et al.
6,773,104 B2 8/2004 Cornelius et al.
6,818,685 B1 11/2004 Chapman
6,821,584 B2 11/2004 Tashiro et al.
6,835,676 B2 12/2004 Kim et al.
6,843,560 B2 1/2005 Romano, Jr. et al.
7,026,023 B2 4/2006 Masuda et al.
7,029,096 B2 4/2006 Weijkamp et al.
7,335,407 B2 2/2008 Landry-Coltrain et al.
7,695,783 B2 4/2010 Merkel et al.
7,854,799 B2 12/2010 Hoogmartens
8,085,442 B2 12/2011 De Waal
8,316,604 B2 11/2012 Thiers
8,328,303 B2 12/2012 Frati
8,500,230 B2 8/2013 Thiers et al.
8,771,811 B2 7/2014 Takahashi et al.
9,321,278 B2 4/2016 Clement et al.
9,566,823 B2 2/2017 Clement et al.
9,770,937 B2 9/2017 Clement
10,471,769 B2 11/2019 Clement
10,814,648 B1 10/2020 Clement et al.
10,906,349 B2 2/2021 Clement
11,446,938 B2 * 9/2022 Clement .............. B41M 5/5218
2001/0036552 A1 11/2001 Otani et al.
2002/0043175 A1 4/2002 Walker et al.
2003/0064208 A1 4/2003 Yamada et al.
2003/0068473 A1 4/2003 Okumura et al.
2003/0138599 A1 7/2003 Kamikubo
2003/0148073 A1 8/2003 Landry-Coltrain et al.
2003/0198885 A1 10/2003 Tamagawa et al.
2004/0081773 A1 4/2004 Ishida et al.
2004/0141041 A1 7/2004 Tsutsumi et al.
2004/0209011 A1 10/2004 Kondo et al.
2004/0261964 A1 12/2004 Asano et al.
2005/0171245 A1 8/2005 Ni et al.
2005/0191443 A1 9/2005 Sunagawa et al.
2005/0221024 A1 10/2005 Teshima et al.
2006/0060101 A1 3/2006 Nasser
2006/0088672 A1 4/2006 Totani et al.
2006/0130421 A1 6/2006 Nollet et al.
2006/0234027 A1 10/2006 Huusken
2006/0279621 A1 12/2006 Morohoshi
2007/0087138 A1 4/2007 Koenig et al.
2007/0202263 A1 8/2007 Kitamura et al.
2007/0283648 A1 12/2007 Chen
2008/0090032 A1 4/2008 Perrin et al.
2008/0318008 A1 12/2008 Wielstra et al.
2010/0047455 A1 2/2010 Hoogmartens
2010/0253735 A1 10/2010 Irita
2010/0282407 A1 * 11/2010 van der Zwan ....... D21H 27/26 156/277
2011/0159208 A1 6/2011 Price
2011/0211012 A1 9/2011 Irita
2011/0268897 A1 11/2011 Klemann
2012/0021147 A1 1/2012 Liao
2013/0070017 A1 3/2013 Fujii et al.
2013/0286088 A1 10/2013 Ryberg et al.
2013/0295352 A1 11/2013 Thiers et al.
2014/0023832 A1 * 1/2014 Pervan ..................... B41M 1/24 428/173
2014/0028772 A1 1/2014 Pervan
2014/0196618 A1 7/2014 Pervan et al.
2014/0370209 A1 12/2014 Walp
2016/0208121 A1 7/2016 De Mondt et al.
2020/0130381 A1 4/2020 Clement et al.

FOREIGN PATENT DOCUMENTS

CN 1628968 6/2005
CN 101014468 A 8/2007
CN 101084125 12/2007
CN 101204690 A 6/2008
CN 101378912 A 3/2009
CN 101541538 A 9/2009
CN 101925705 A 12/2010
CN 102501698 6/2012
CN 103502018 A 1/2014
CN 101998896 12/2014
DE 19725829 C1 8/1998
DE 19715268 A1 10/1998
DE 19916546 A1 10/2000
DE 19945279 C1 4/2001

(56) References Cited

FOREIGN PATENT DOCUMENTS

| | | | | |
|---|---|---|---|---|
| DE | 19955081 C1 | 8/2001 | | |
| DE | 102004036664 | 3/2006 | | |
| DE | 102004036922 A1 | 3/2006 | | |
| DE | 102007013132 A1 | 9/2008 | | |
| DE | 102007013135 A1 | 9/2008 | | |
| EP | 0054405 A1 | 6/1982 | | |
| EP | 0737591 A1 | 10/1996 | | |
| EP | 1044822 A1 | 10/2000 | | |
| EP | 1108529 A2 | 6/2001 | | |
| EP | 1290290 A1 | 3/2003 | | |
| EP | 1700689 A1 | 9/2006 | | |
| EP | 1749676 A1 | 2/2007 | | |
| EP | 1857511 A1 | 11/2007 | | |
| EP | 1872959 A1 | 1/2008 | | |
| EP | 1923223 | 5/2008 | | |
| EP | 2050886 A2 | 4/2009 | | |
| EP | 2132041 A1 | 12/2009 | | |
| EP | 2293946 A1 | 3/2011 | | |
| EP | 2402154 A1 | 1/2012 | | |
| EP | 2431190 A2 | 3/2012 | | |
| EP | 2565035 A1 | 3/2013 | | |
| EP | 2695745 A1 | 2/2014 | | |
| EP | 2894044 A1 | 7/2015 | | |
| EP | 2894044 A1 * | 7/2015 | ................ | B41J 2/01 |
| JP | 8-197697 | 8/1996 | | |
| JP | 10-747 | 1/1998 | | |
| JP | 2001071447 A | 3/2001 | | |
| JP | 2002-316397 A | 10/2002 | | |
| RU | 2219065 C1 | 12/2003 | | |
| RU | 2239031 C2 | 10/2004 | | |
| RU | 2379198 C2 | 1/2009 | | |
| WO | 9935335 | 7/1999 | | |
| WO | 0196689 A1 | 12/2001 | | |
| WO | 2004042168 A1 | 5/2004 | | |
| WO | 2004074577 A1 | 9/2004 | | |
| WO | 2005028750 A1 | 3/2005 | | |
| WO | 2005116337 A1 | 12/2005 | | |
| WO | 2006013469 A1 | 2/2006 | | |
| WO | 2006130708 A2 | 12/2006 | | |
| WO | 2007119888 A1 | 10/2007 | | |
| WO | 2008110254 A1 | 9/2008 | | |
| WO | 2008110275 A1 | 9/2008 | | |
| WO | 2008134823 A1 | 11/2008 | | |
| WO | 2009077561 A1 | 6/2009 | | |
| WO | 2009080376 A1 | 7/2009 | | |
| WO | 2009124704 A1 | 10/2009 | | |
| WO | 2009153680 A2 | 12/2009 | | |
| WO | 2010000358 A1 | 1/2010 | | |
| WO | 2011124503 A2 | 10/2011 | | |

OTHER PUBLICATIONS

Z. Lu et al., "Layer-by-layer nanoparticle coatings on lignocellulose wood microfibers", Colloids and Surfaces A: Physicochem. Eng. Aspects 292 (2007), Jun. 20, 2006, p. 56-62.

Safety Data Sheet, HP Tinte C1892A—Black, Admitted prior art.

G. A. Smook, Handbook of pulp & paper terminology: a guide to industrial and technological usage, 2nd edition, Angus Wilde Publications Inc., 2001, p. 246.

HP DesignJet 2500/2000CP Printer User's Guide, C4704A/C4703A, Admitted prior art, p. 1-340.

Material Safety Data Sheet, HP Tinte C1893A—No. 93 Cyan, Admitted prior art.

Material Safety Data Sheet, HP Tinte C1895A—No. 95 Yellow, Admitted prior art.

Material Safety Data Sheet, HP Tinte C1894A—No. 94 Magenta, Admitted prior art.

Hue P. Le, "Progress and Trends in Ink-jet Printing Technology", Journal of Imaging Science and Technology, vol. 42, No. 1, Jan./Feb. 1998, p. 49-62.

Zhenglin Tang et al., "Special Printing Technology", Printing Industry Press, Sep. 2007, p. 36-38.

Shlomo Magdassi, "The Chemistry of Inkjet Inks", World Scientific Publishing Co., Pte. Ltd., 2010, Chapter 7.

M. J. Moura et al., "The Use of Mercury Intrusion Porosimetery to the Characterization of Eucalyptus Wood, Pulp and Paper", Iberoamerican Congress on Pulp and Paper Research 2002, p. 1-7.

* cited by examiner

METHOD FOR MANUFACTURING PANELS HAVING A DECORATIVE SURFACE

This application is a continuation application of U.S. patent application Ser. No. 17/035,906 filed Sep. 29, 2020, which is a continuation of U.S. patent application Ser. No. 16/925,885 filed Jul. 10, 2020, now U.S. Pat. No. 10,814,648 issued Oct. 27, 2020, which is a continuation application of U.S. patent application Ser. No. 16/720,301 filed Dec. 19, 2019, now U.S. Pat. No. 10,807,385 issued Oct. 20, 2020, which is a continuation application of U.S. patent application Ser. No. 16/247,969 filed Jan. 15, 2019, now U.S. Pat. No. 10,549,550 issued Feb. 4, 2020, which is a divisional application of U.S. patent application Ser. No. 15/390,641 filed Dec. 26, 2016, now U.S. Pat. No. 10,214,028 issued Feb. 26, 2019, which is a continuation application of U.S. patent application Ser. No. 15/075,515 filed Mar. 21, 2016, now U.S. Pat. No. 9,566,823 issued Feb. 14, 2017, which is a continuation application of U.S. patent application Ser. No. 14/417,766 filed Jan. 27, 2015, now U.S. Pat. No. 9,321,278 issued Apr. 26, 2016, which is a US National Phase Application of International Application No. PCT/IB2013/056310 filed Aug. 1, 2013, which claims priority under 35 USC 119(a)-(d) to EP Patent Application No. 12179400.2 filed on Aug. 6, 2012, and under 35 USC 119(e) to U.S. Provisional Application No. 61/751,364 filed Jan. 11, 2013, the entire content of all ten of which are incorporated herein by reference.

BACKGROUND OF THE INVENTION

1. Field

The present invention relates to a method for manufacturing panels having a decorative surface, or, so-called decorative panels.

More particularly the invention is related to a method for manufacturing panels, wherein said panels at least comprise a substrate and a top layer, wherein said top layer comprises a paper layer having a printed pattern. The panels of the invention may relate to furniture panels, ceiling panels, flooring panels or similar, wherein these panels preferably comprise a wood based substrate, such as an MDF or HDF substrate (Medium of High Density Fiberboard) or a substrate consisting of or essentially made of wood particleboard.

2. Related Art

Traditionally, the decor or pattern of such panels is printed on paper by means of offset or rotogravure printing. The obtained paper is taken up as a decorative paper in a so called laminate panel. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to the EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Providing the printed paper with resin can lead to expansion of the paper, which is difficult to control. Problems can arise, particularly in the cases where, like in the EP 1 290 290, a correspondence between the relief and the printed decor is desired.

With the aim of restricting the costs of decorative paper and of preventing expansion, a method is known, for example from the DE 197 25 82-9 C1, wherein the analog printing process, for example an offset process, is used to print directly on the plate shaped substrate, whether or not with the intermediary of preparatory layers, such as melamine based layers. The printed decor is finished with melamine based layers and the created whole is cured using a pressing operation. Directly printing on melamine based preparatory layers leads, especially when use is made of water based inks, to inferior printing quality. The printing process furthermore shows the same problems regarding the attainable flexibility, as when printing on paper.

Instead of analog printing techniques digital printing techniques, especially inkjet printing technique, is becoming increasingly popular for the creation of decors or patterns, be it on paper or directly on a plate-shaped substrate possibly with the intermediary of preparatory layers. Such digital techniques can enhance the flexibility in the printing of decors significantly. Reference is made to the EP 1 872 959, WO 2011/124503, EP 1 857 511, EP 2 431 190 and the EP 2 293 946, where such techniques are disclosed.

The method of the invention more particularly at least comprises the step of providing said paper layer with thermosetting resin and the step of providing said resin provided paper layer with at least a portion of said printed pattern. Preferably multi color printed patterns are applied for the realization of a decor, e.g. representing a wood pattern, on the abovementioned paper layer. Such decor extends over the majority, or even over the totality of the resin provided paper layer. Such a technique is known as such for example from the EP 2 132 041, where a digital printer, more particularly an inkjet printer is applied. It has however been very difficult to reliably further process such printed paper for manufacturing laminate panels, such as in a DPL process, since pressing defects may originate in the resin surface and milling, drilling or sawing through the laminate surface are at the edge thereof often leads to splitting in the top layer.

SUMMARY

The present invention aims in the first place at an alternative method for manufacturing panels having a decorative surface, and seeks, in accordance with several of its preferred embodiments, to solve one or more of the problems arising in the state of the art.

Therefore the present invention relates to a method for manufacturing panels having a decorative surface, wherein said panels at least comprise a substrate and a top layer, wherein said top layer comprises a paper layer having a printed pattern, and wherein said method at least comprises the step of providing said paper layer with thermosetting resin and the step of providing said resin provided paper layer with at least a portion of said printed pattern, with as a characteristic that for providing said portion of said printed pattern use is made of pigment containing inks deposited on said paper layer by means of a digital inkjet printer, and in that the dry weight of the total volume of said pigment containing inks deposited on said paper layer is lower than 15 grams per square meter.

The present invention combines several measures that can enable an industrial and reliable application of a digitally printed paper layer in the production of laminate panels.

A first measure is providing the printed pattern, or at least a portion thereof, on a paper layer that has been provided with resin. This measure improves the stability of the paper. In such cases at least a portion of the expansion or shrinkage due to the resin provision takes place before printing. Preferably the resin provided paper layer is dried before printing, for example to a residual humidity of 10% or less. In this case the most important portion of the expansion or shrinkage of the paper layer is neutralized.

This first measure may further assure complete impregnation of the paper layer, such that the obtained laminate top layers are less prone to splitting. Complete impregnation has proven to be difficult to attain after digital printing, especially when use is made of pigment containing inks, such as UV curable inks.

A second measure is using a digital inkjet printing operation. By this measure flexibility is largely increased as compared to analog printing techniques. According to the most preferred embodiment, use is made of a drop-on-demand inkjet printer, wherein only the desired ink droplets are fired or jetted from the nozzles of the print heads. It is however not excluded that use would be made of a continuous inkjet printer, wherein continuously ink droplets are fired from the nozzles of the print heads, but wherein the undesired droplets are carried away and do not reach the resin provided paper layer to be printed.

A third measure is the use of pigment containing inks. These inks provide for a high enough chemical and UV resistance of the printed pattern, and provide an acceptable color richness. The problems created by such inks are counteracted by the other three measures of the invention. One of these problems is concerned with difficulties arising when impregnating such printed paper layer. This problem is solved, or at least alleviated, by the abovementioned first measure. A second one of these problems is concerned with difficulties arising when pressing or heating such printed paper layer in an attempt to cure the available resin. This problem is solved, or at least alleviated, by the below mentioned fourth measure.

A fourth measure is the limitation of the dry weight of the applied ink. This limitation leads to a layer of ink that lowers the risk of pressing defects and splitting in the top layer. Indeed, possible interference between the ink layer and the thermosetting resin during the pressing operation is limited. The use of pigmented inks, in accordance with the present invention, has the advantage that the pigment stays on the surface of the paper. This is desirable, because less ink is needed to create the same intensity of color.

It should be noted that the above four measures bring about an important synergistic effect in that they enable reliable industrial application of digital printing of decor papers acceptable for use in laminate panels, as will be further explained in the remainder of the introduction of this patent application.

Preferably for said pigment containing ink use is made of a UV curable ink. Alternatively also water based ink or solvent ink could be used. UV curable inks allow to form a print with a high definition and color intensity. Each jetted droplet can immediately be completely or partially cured by means of UV radiation. Such technique is sometimes called "pin cure" and prevents or restricts bleeding of the ink droplets on the paper layer. Such "pin cure" is usually followed by a complete curing after the print is finished, or after a portion of the print is finished. In particular a cured layer of UV ink brings about problems when pressing. Indeed, the polymeric binder resin, or vehicle, comprised in the ink builds a film on the printed surface of the paper layer. This film hinders the release of water molecules upon pressing, heating and/or curing the thermosetting resin, thereby giving rise to the origination of trapped bubbles and an insufficient adherence of the printed paper layer to layers situated above or below the printed paper layer. Said water molecules are usually present in the thermosetting resin, but may also originate as a by-product of the polycondensation reaction of particular thermosetting resins. The measures of the present invention alleviate these problems. Where in the past it was necessary to finish panels featuring a cured UV ink layer with expensive lacquers, such as acryl based UV curable lacquers, the invention makes it possible to reliably use thermosetting resin, more particularly melamine resin, for industrially finishing such panels. As a consequence the invention enables the formation of relief in the panels top layer by means of techniques similar to the prior art techniques of EP 1 290 290. Water based inks are still a lot more economical than UV curable inks, and form a lesser problem regarding compatibility with thermosetting resins, such as melamine resins. Water based inks are inks of which the vehicle comprises water, or substantially consists of water. Because "pin cure" or a similar immediate drying of a jetted droplet is not available for water based inks, bleeding and ink penetration into the paper substrate is common, and because of this a loss of definition can originate. However, methods wherein water based inks are applied also benefit from the measures of the invention for attaining an acceptable quality and color richness.

Preferably for said pigment containing ink use is made of an ink comprising a polymeric vehicle, such as an acrylic or methacrylic resin. It is in particular with these inks that the invention brings major advantages and enhancements.

Preferably for said pigments use is made of organic pigments. Organic pigments are known to be more stable when exposed to sunlight, or other sources of UV radiation.

Preferably said pigments have an average particle size of less than 250 nanometer.

Preferably said dry weight of deposited pigmented ink is less than 10 grams per square meter. Preferably the printed pattern is entirely, or at least essentially, made up of such pigmented ink, wherein the printed pattern covers the majority, and preferably 80 percent or more of the surface of said paper layer.

It is noted that dried pigmented ink, depending on the ink used, normally comprises at least the cured vehicle as well as the pigments contained in the deposited ink. Other components, such as solvents, might have escaped during curing or drying of the deposited ink.

Preferably said total volume is less than 15 milliliter, or even better less than 10 milliliter or still less.

Preferably said paper layer has a paper weight, i.e. without taking into account the resin provided on it, of between 50 and 100 grams per square meter and possibly up to 130 grams per square meter. The weight of the paper cannot be too high, as then the amount of resin needed to sufficiently impregnate the paper would be too high, and reliably further processing the printed paper in a pressing operation becomes badly feasible.

Preferably for the paper layer use is made of a paper with a mean air resistance according to the Gurley method (Tappi T460) of below 30 or even better of about 25 seconds or below. Such paper has a rather open structure and is advantageous in the method of the present invention as it allows readily for impregnation of its core, as well as for water vapor to escape from it upon pressing. Such water vapor originates from the resin-water mixture that is provided on the paper layer, as well as from possibly from the curing reaction of the thermosetting resin.

Preferably said paper layer contains titanium oxide as a whitening agent.

Preferably said paper layer is free from any separate ink receiving substance or ink receiving layer upon printing. With "separate" it is meant separate from the resin provided on the paper layer.

Preferably said paper layer is provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably said paper layer is provided with such an amount of thermosetting resin, that at least the paper core is satisfied with the resin. Such satisfaction can be reached when an amount of resin is provided that corresponds to at least 1.5 or at least 2 times the paper weight. Preferably the paper layer is firstly impregnated through or satisfied, and, afterwards, at least at the side thereof to be printed, resin is partially removed.

Preferably the resin provided on said paper layer is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper layer with thermosetting resin involves applying a mixture of water and the resin on said paper layer. The application of said mixture might involve immersion of the paper layer in a bath of said mixture and/or spraying or jetting said mixture. Preferably the resin is provided in a dosed manner, for example by using one or more squeezing rollers and/or doctor blades to set the amount of resin added to the paper layer.

Preferably said thermosetting resin is a melamine based resin, more particularly a melamine formaldehyde resin with a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapor bubbles to the surface, however the present invention provides measures for limiting such hindrance. Other examples of such thermosetting resins leading to a similar polycondensation reaction include ureum-formaldehyde based resins and phenol-formaldehyde based resins.

As is clear from the above, the method of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Preferably a further resin layer is applied above the printed pattern after printing, e.g. by way of an overlay, i.e. a resin provided carrier layer, or a liquid coating, preferably while the decor layer is laying on the substrate, either loosely or already connected or adhered thereto.

Preferably the pigment containing ink and the thermosetting resin is such that, upon printing, a jetted droplet of ink only slightly wets the resin provided paper layer. The contact angle at the interface between the droplet of ink and resin provided paper layer is preferably between 0 and 90°, and even better between 10° and 50°. Allowing for a slight wetting or bleeding improves the permeability of the print for the resin and/or vapor bubbles, while maintaining a sufficient resolution of the print. The inventors have noted that sufficiently good properties are attained when the contact angle at the interface between a water droplet and the resin provided layer shows the above values, namely preferably between 0 and 90°, and even better between 10° and 50°. A contact angle of about 50°, e.g. between 40° and 60° has been shown to give good results. Measuring the contact angle with water droplets places a smaller burden for any experimentation that would be needed to define the content of additives, primarily of wetting agent, in the resin, when necessary for realizing the above contact angle. In the event of some absorption of the water droplets, a short time should be allowed to lapse before measuring the contact angle, e.g. less than 10 seconds, such that a sufficiently stable measurement of the contact angle is attained.

As abovementioned, the jetted droplets of pigment containing ink are preferably pin-cured, in case the ink is UV curable.

Preferably said paper layer is a colored, pigmented and/or dyed base paper. The use of a colored and/or dyed base paper enables further limiting the dry weight of deposited ink for attaining a particular pattern or color. Preferably the dye or pigment is added to the pulp before the paper sheet is formed. According to an alternative the thermosetting resin provided on said paper layer to be printed is colored or pigmented.

It should be noted that starting from a colored, pigmented or dyed base paper brings advantages also in cases where the base paper has not been provided with thermosetting resin prior to printing, i.e. without practicing the above described first measure. Indeed the color of the base paper can be chosen such that the ink volume applied still allows for impregnation with thermosetting resin after printing. Therefore and, in accordance with a deviating embodiment where the first measure is not necessarily practiced, the invention also concerns a method for manufacturing panels having a decorative surface, wherein said panels at least comprise a substrate and a top layer, wherein said top layer comprises a paper layer having a printed pattern, and wherein said method at least comprises the step of providing said paper layer with at least a portion of said printed pattern, characterized in that said paper layer is a dyed or pigmented paper layer and in that for providing said portion of said printed pattern use is made of pigment containing inks deposited on said paper layer by means of a digital inkjet printer. Preferably the dye or pigment is added to the pulp before the paper sheet is formed. the dry weight of the inks is less than 15 grams per square meter, though not necessarily. It should be clear that the preferred embodiments described above and here below are also applicable in the case of this deviating embodiment, such as for example the type, color and content of the inks used, the paper properties, the amount and properties of the thermosetting resin provided on the paper layer, however, in this case, possibly after printing and the use of the printed paper layer in a method for manufacturing DPL panels.

Preferably said top layer comprises a layer of thermosetting resin above said paper layer having said printed pattern and above said printed pattern. It is in these situations that the invention is most useful. With such embodiments the layer of thermosetting resin above the printed pattern, and the thermosetting resin of the printed paper layer preferably interact and bind during a subsequent pressing operation. It is in the pressing operation that defects and the causes of future splitting may originate. According to the inventors these defects and other malicious effects are caused by the intermediate pigmented ink layer, e.g. by the dried vehicle thereof, which makes up a barrier for such interaction or binding. Such barrier also keeps chemical water, possibly originating from the polycondensation of the thermosetting resin, trapped in the top layer. Such locked-in bubbles of water or vapour lead to a loss of transparency of the top layer. Limiting the dry weight of deposited pigmented inks to 15 grams per square meter or below, can solve the issues of the barrier formation to a large extent.

Clearly, the method of the invention preferably comprises the step of providing said layer of thermosetting resin above the printed pattern. Said layer of thermosetting resin provides for a transparent or translucent layer that enhances the wear resistance of the decorative panel. Preferably the decorative panel obtained by the method of the invention has a quality of at least AC2 or AC3 in accordance with EN 13329. With this aim hard particles, like aluminiumoxide particles, can be incorporated in such transparent or translucent layer. Particles having an average particle size of between 1 and 200 micrometer are preferred. Preferably an amount of such particles of between 1 and 40 grams per square meter is applied above the printed pattern. An amount lower than 20 grams per square meter can suffice for the lower qualities. The transparent or translucent layer may comprise a paper layer. Such paper layer preferably has a paper weight of between 10 and 50 grams per square meter, for example a so-called overlay commonly used in laminate panels. Preferably the step of providing said layer of thermosetting resin above the printed pattern involves a press treatment. Preferably a temperature above 150° C. is applied in said press treatment, e.g. between 180° and 220° C., and a pressure of more than 20 bar, e.g. between 35 and 40 bar.

According to a special embodiment said layer of thermosetting resin above said paper layer having said printed pattern is a layer of colored thermosetting resin. For example use can be made of a colored or pigmented overlay, wherein the colored resin is provided on a paper layer. The use of a colored resin enables further limiting the dry weight of deposited ink for attaining a particular pattern. According to a variant the paper layer of the overlay is colored in that it is provided with a print itself, preferably at the side thereof that is or will be directed to the substrate. Such print might also be a digital inkjet print by means of pigment containing inks and/or might be obtained by means of the method of the invention.

Preferably use is made of pigment containing inks of between 3 and 6 or even up to 8 different colors. The use of more than just the at least 3 base colors, e.g. more colors than Cyan, Magenta, Yellow and possibly black (CMYK), may lead to a lower need of deposited ink. One or more dedicated colors, whether or not supplementing the inks of the CMYK colors, might be used, such that these colors must not necessarily be formed by color addition of the several base colors, but can be created by jetting the dedicated color only. In the case of wood patterns, a brownish dedicated color might be used, thereby tremendously lowering the needed dry weight of deposited inks for the typical colors of wood patterns.

According to an important example said digital inkjet printer preferably uses at least two differently colored pigment containing inks, wherein both inks comprise reddish pigment.

According to another important example said digital inkjet printer uses CMYK colors and in addition at least a light yellow and/or a light magenta ink, i.e. an ink of a lighter yellow, respectively magenta than the base color Y, respectively M of the applied CMYK scheme.

According to still another important example said digital inkjet printer uses a dark pigment containing ink, having less than 1 percent by weight of carbon black pigment or being essentially free thereof, such as a dark brown colored pigment containing ink. Such an ink can be used instead of the typically carbon black pigment containing K color. The inventors have found particular problems of compatibility with the thermosetting resin, where carbon black containing ink is deposited.

Preferably a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks.

Preferably a digital inkjet printer is applied that allows to work with ink droplets of several volumes in one and the same print, or with so-called halftone or gray scale. The possibility of half tone or gray scale printing enables further limitation of the dry weight of deposited ink while maintaining an excellent print definition.

Preferably a digital inkjet printer is applied that allows to attain a definition of at least 200 dpi, or even better at least 300 dpi (dots per inch).

Preferably said digital inkjet printer is of the single pass type, wherein the paper layer is provided with said printed pattern in a single continuous relative movement of the paper layer with respect to the printer or print heads. It is not excluded that other digital inkjet printers are used to put the invention into practice, such as so called multi-pass or plotter type printers. With printers of the single pass type, as well as with printers of the multi pas type the print heads preferably extend over the entire width of the paper to be printed. This is not the case with a plotter arrangement, wherein the print heads need to perform a scanning motion in the width direction of the paper layer.

Preferably said digital inkjet printer is of the so-called roll-to-sheet type, wherein the paper layer is fed from a roll, printed upon, and subsequently cut to sheets. According to a first alternative the paper layer is fed from a roll, printed upon, and rolled back up again. According to a second alternative the paper is fed in sheet form, printed upon, and stacked sheet by sheet, e.g. on a pallet.

It is clear that, according to the most preferred embodiment of the present invention, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment. Alternatively, the paper layer, after it has been provided with resin, in accordance to the invention, can be attached to the plate shaped substrate by locally welding it to the substrate, or, in other words, by locally hardening the available resin, and/or can be attached to the plate shaped substrate by ionization.

Preferably the method of the invention further comprises the step of applying a counter layer or balancing layer at the surface of the substrate opposite the printed paper layer The counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment.

According to the most preferred embodiment, the steps of the method of the invention are taken up in a DPL process.

According to the most important example of the invention, a standard printing paper, like the one used for rotogravure, having a weight between 60 and 90 grams per square meter is provided with melamine resin by means of a standard impregnation channel; namely by means of roller, immersion, jetting and/or spraying equipment. The resin provided paper layer is then dried until a residual humidity of less than 10%, preferably about 7%, is reached. The resin provided paper layer is then printed by means of a digital inkjet printer, wherein use is made of UV curable pigment containing inks. The ink layer is firstly cured and then a stack is formed of a resin provided counter layer, a plate shaped substrate, the printed resin provided paper layer and a resin provided paper layer forming a so-called overlay. The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer. The latter is possible in all embodiments of the present invention.

It is clear that the invention also concerns panels that are obtained or are obtainable by means of a method in accordance with the present invention or in accordance with the above mentioned deviating embodiment thereof. Such panel has as a characteristic that it contains a plate shaped substrate and a printed pattern provided on a paper layer, wherein the pattern is at least partially obtained through digital inkjet printing of pigment containing inks and that the dry weight of the inks is less than 15 grams per square meter and/or that the paper layer comprises a pigmented or dyed base paper. It is clear that the panel of the invention may have one or more further features equivalent to the features discussed in relation to the preferred embodiments of the methods of the invention. Preferably said panel further comprises a layer of thermosetting resin above said printed pattern.

It is further clear that the method is particularly suited to manufacture floor panels, furniture panels, ceiling panels and/or wall panels.

BRIEF DESCRIPTION OF THE DRAWINGS

With the intention of better showing the characteristics according to the invention, in the following, as an example without limitative character, an embodiment is described, with reference to the accompanying drawings, wherein:

FIGS. 3 and 4 show a decorative panel obtainable by means of the method of FIG. 2, wherein FIG. 3 is a perspective view of said panel, and FIG. 4 is a cross section at a larger scale along the line Iv-Iv in FIG. 3.

DESCRIPTION OF NON-LIMITING EMBODIMENTS

Figure 1:
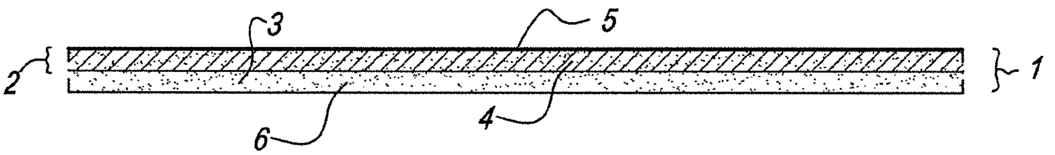
FIG. 1 shows an embodiment of a paper layer that has been printed in accordance with the method of the invention.

FIG. 1 illustrates a decorative layer 1 for incorporation in a decorative panel, obtainable by means of a method in accordance with the invention. The decorative layer 1 comprises a paper sheet 2 provided with thermosetting resin 3. The thermosetting resin 3 satisfies or fills the paper core 4. The paper layer has been provided with a digitally printed ink layer 5 on the basis of pigment containing inks.

FIG. 1 also clearly shows that at least at the side opposite the digitally printed ink layer the decorative layer 1 comprises a resin layer 6 outside the paper core 4. At the side that contains said digitally printed ink layer 5 a similar resin layer is not available, or at least the available resin layer is significantly thinner, for example less than half the thickness of the resin layer 6.

From FIG. 1 it is clear that the digitally printed ink layer 5 covers the majority of the papers surface. Such print might for example represent a wood pattern, a stone pattern or a fantasy pattern.

Figure 3:
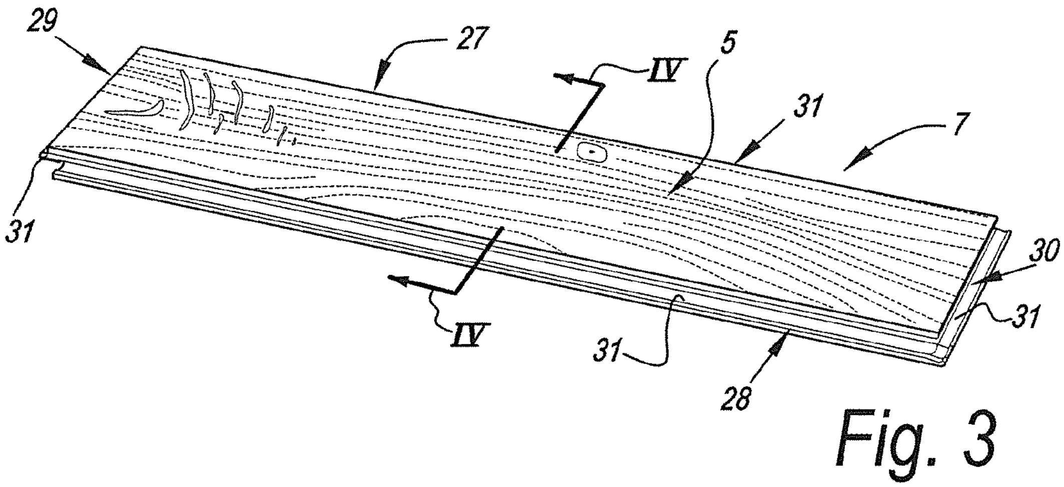
Figure 4:
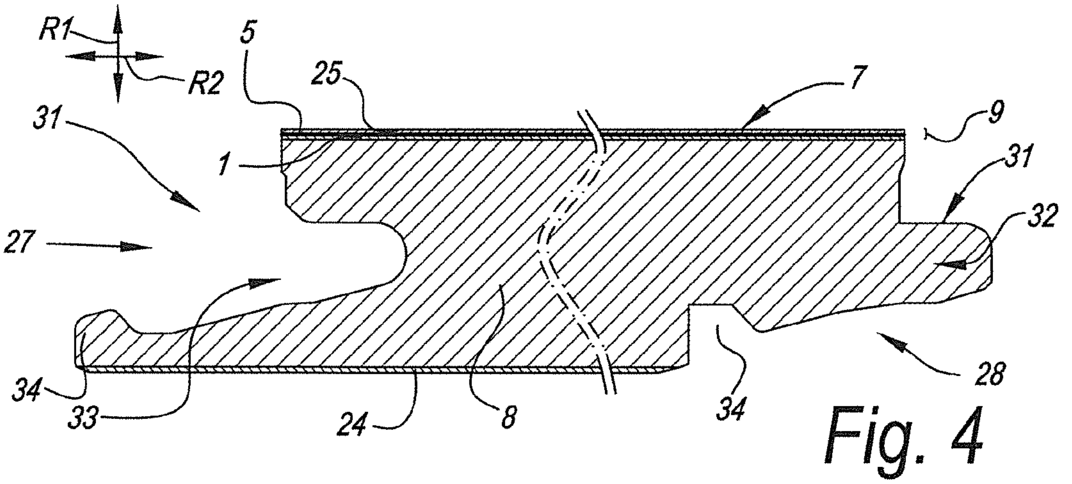
Figure 2:
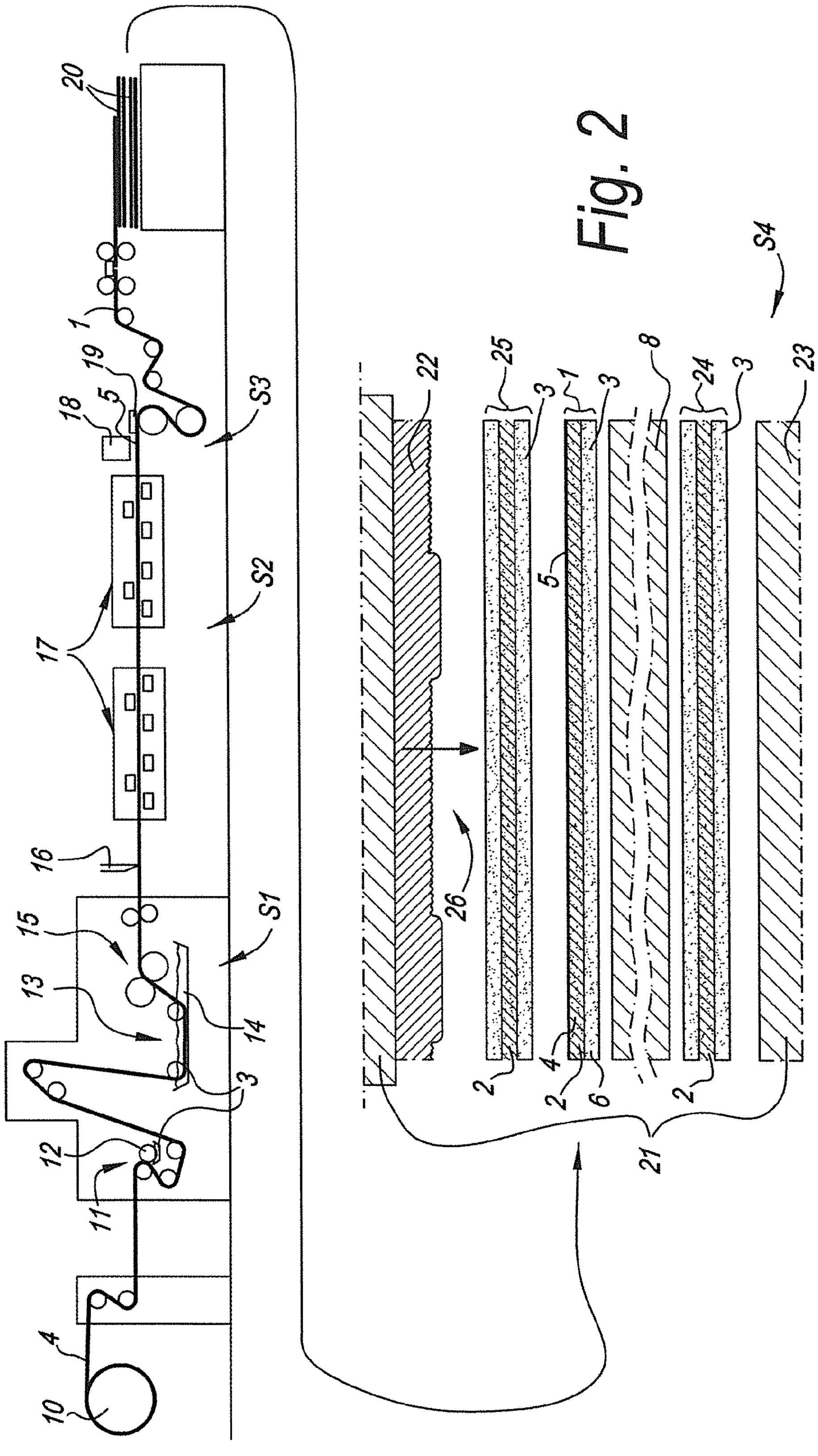
FIG. 2 illustrates some steps of a method in accordance with the invention.

FIG. 2 illustrates a method for manufacturing decorative panels 7 of the type shown in FIGS. 3 and 4. The obtained decorative panels 7 at least comprise a substrate 8 and a top layer 9. The top layer comprises a paper layer 2 with a printed pattern or a digitally printed ink layer 5 representing a wood pattern, as is the case here. The method comprises at least the step S1 of providing said paper layer 2 with thermosetting resin 3. Hereto the paper layer 2 is taken from a roll 10 and transported to a first impregnation station 11 where said resin 3, more particularly a mixture of water and resin 3, is applied at one side of the paper layer 2, in this case, by means of a dipping roller 12. The paper layer 2 is then allowed to rest while in this case being transported upwards. The resting allows for the resin 3 to penetrate the paper core 4. The paper layer 2 then comes into a second impregnation station 13 where the paper layer 2 is immersed in a bath 14 of resin 3, more particularly a mixture of water and resin 3. A set of squeezing rollers 15 allows to dose the amount of resin 3 applied to the paper layer 2.

In the example an amount of applied resin 3 is removed again from the side that is to be provided with the digitally printed ink layer 5, in this case by means of a doctor blade 16.

In a second step S2 the resin provided paper layer 2 is dried and its residual humidity level is brought to below 10%. In the example hot air ovens 17 are used, but alternatively other heating equipment can be used, such as microwave drying equipment.

FIG. 2 also illustrates that the method at least comprises the step S3 of providing said resin provided paper layer 2 with a printed pattern, in this case a digitally printed ink layer 5 representing a wood pattern. Use is made of pigment containing UV curable inks, that are deposited on the paper layer 2 by means of a digital inkjet printer 18, in this case a single pass inkjet printer having print heads extending over the width of the paper layer 2. The dry weight of the total volume of pigment containing inks deposited on said paper layer 2 is lower than 15 grams per square meter. The inkjet printer is preferably a drop on demand printer that allows to pin cure the deposited droplets of UV curable pigmented ink. Preferably a further UV curing station 19 is provided downstream of the printer 18. After printing and curing the inks the continuous paper layer 2 is cut to sheets 20 and stacked. The obtained sheets 20 resemble the decorative layer 1 illustrated in FIG. 1.

According to a non illustrated variant the step of the printing S3 and/or the curing of the ink might be carried out after the resin provided paper layer 2 is already cut to sheets 20.

According to still another non illustrated variant, the resin provided paper layer 2 might be rolled up again before cutting it to sheets and/or before printing.

FIG. 2 further illustrate that in a subsequent step S4 the obtained sheets 20 or the decorative layer 1 is taken up in a stack to be pressed in a short daylight press 21 between upper and lower press plates 22-23. Said stack comprises from bottom to top a counter layer 24, a plate shaped substrate 8, the abovementioned decorative layer 1 and a protective layer 25, wherein the counter layer 24 and the protective layer 25 both comprise a paper layer 2 and resin 3. The stack is then pressed and the press treatment results in a mutual connection between the constituent layers 1-8-24-25, including the substrate 8, of the stack, as well as in a hardening or curing of the available resin 3. More particularly here a polycondensation reaction of the melamine-formaldehyde resin 3 takes place, having water as a by-product.

The upper press plate 22 is a structured press plates that provides a relief in the melamine surface of the panel 1 during the same press treatment of the step S4, by bringing the structured surface 26 of the upper press plate 22 into contact with the melamine of the protective layer 25.

FIGS. 3 and 4 illustrate that the obtained decorative panel 7 can have the shape of a rectangular and oblong laminate floor panel, with a pair of long sides 27-28 and a pair of short sides 29-30 and having an HDF or MDF substrate 8. In this case the panel 7 is at long at least the long sides 27-28 with coupling means 31 allowing to lock the respective sides 27-28 together with the sides of a similar panel both in a direction R1 perpendicular to the plane of the coupled panels, as in a direction R2 perpendicular to the coupled sides and in the plane of the coupled panels. As illustrated in FIG. 4 such coupling means or coupling parts can basically have the shape of a tongue 32 and a groove 33, provided with additional cooperating locking means 34 allowing for said locking in the direction R2.

The present invention is in no way limited to the above described embodiments, but such method may be realised according to several variants without leaving the scope of the invention as defined by the appended claims.

What is claimed is:

1. A method for manufacturing panels having a decorative surface, wherein the panels include a plate shaped substrate and a top layer, and the top layer includes a paper layer having a printed pattern, the method comprising:

- providing the paper layer with a treatment, including providing the paper layer with an ink receiving substance;
- providing the treated paper layer with at least a portion of the printed pattern;
- wherein providing the portion of the printed pattern involves depositing pigment containing inks on the treated paper layer using a digital inkjet printer;
- wherein the pigment containing inks are water-based;
- wherein the digital inkjet printer includes print heads with nozzles, and the depositing involves firing droplets of pigment containing inks from the nozzles onto the treated paper layer;
- wherein the paper layer is fed from a roll, printed upon, and rolled back up again, and wherein the paper layer, while printing, is flexible and is attached to the plate shaped substrate only after printing;
- providing a layer of thermosetting resin above the paper layer having the printed pattern and above the printed pattern;
- wherein providing the layer of thermosetting resin involves a press treatment;
- wherein the paper layer is a colored base paper, a pigmented base paper, and/or a dyed base paper;
- wherein the dry weight of the deposited pigment containing ink is less than 10 grams per square meter; and
- wherein the printed pattern is a wood pattern, wherein the pigment containing inks include colored pigments and comprise only 4 different colors, and wherein the colors comprise cyan, yellow, black, and red.

2. The method according to claim 1, wherein the printed paper layer is provided with a thermosetting resin.

3. The method according to claim 1, wherein the pigment containing inks include pigments that are organic based.

4. The method according to claim 1, wherein the layer of thermosetting resin comprises a paper layer having a weight of between 10 and 50 grams per square meter.

5. The method according to claim 1, wherein the droplets have a volume of 15 picoliters or less.

6. The method according to claim 1, wherein in the press treatment a pressure of more than 20 bar, and a temperature above 150° C. is applied.

7. The method according to claim 1, wherein the layer of thermosetting resin is transparent or translucent.

8. The method according to claim 1, further comprising applying a counter layer or balancing layer at a surface of the substrate opposite the paper layer;

wherein a mutual adherence of the plate shaped substrate, the counter layer or balancing layer, and the layer of thermosetting resin is obtained in one and the same press treatment.

9. The method according to claim 1, wherein the thermosetting resin is a melamine formaldehyde resin with a formaldehyde to melamine ratio of 1.4 to 2.

10. The method according to claim 1, further comprising applying a counter layer or balancing layer at a surface of the substrate opposite the paper layer.

11. The method according to claim 10, wherein the counter layer or balancing layer comprises a paper layer and a thermosetting resin.

12. The method according to claim 1, wherein the layer of thermosetting resin comprises hard particles.

13. The method according to claim 1, wherein the digital inkjet printer is of a single pass type; and wherein the printed pattern is applied to attain a definition of at least 200 dpi.

14. The method according to claim 1, wherein the printed pattern covers 80 percent or more of a surface of the treated paper layer.

15. The method according to claim 1, wherein for the paper layer use is made of a paper having a mean air resistance according to the Gurley method of below 30 seconds, and/or having a weight between 60 and 90 grams per square meter.

* * * * *